INVENTOR.
MURRAY WINDMAN
BY
Bernard Kriegel
ATTORNEY.

United States Patent Office 2,900,074
Patented Aug. 18, 1959

2,900,074

SLIDE TRAY FOR SLIDE CHANGERS

Murray Windman, Los Angeles, Calif., assignor to Windman Brothers, Los Angeles, Calif., a copartnership Application September 26, 1955, Serial No. 536,492

4 Claims. (Cl. 206—62)

The present invention relates to trays for holding a plurality of photographic slides, and more particularly to slide trays adapted for use in projectors embodying slide changers.

An object of the present invention is to provide a tray for holding a plurality of slides in parallel relation, which is capable of releasably securing the slides firmly in place to prevent their inadvertent dropping or removal from the tray when the latter is mounted in the slide changer, as well as when it is out of the slide changer.

Another object of the invention is to provide a tray for holding and storing a plurality of slides in parallel relation, which can retain the slides firmly in place by means of a simple and comparatively inexpensive retention device that does not adversely affect the movement of each slide by the slide changing apparatus from its location in the tray and its subsequent return to such location.

A further object of the invention is to provide a slide tray that can be used interchangeably in a plurality of specifically different slide changer devices.

This invention possesses many other advantages, and has other objects which may be made more clearly apparent from a consideration of a form in which it may be embodied. This form is shown in the drawings accompanying and forming part of the present specification. It will now be described in detail, for the purpose of illustrating the general principles of the invention; but it is to be understood that such detailed description is not to be taken in a limiting sense, since the scope of the invention is best defined by the appended claims.

Referring to the drawings.

Figure 1:
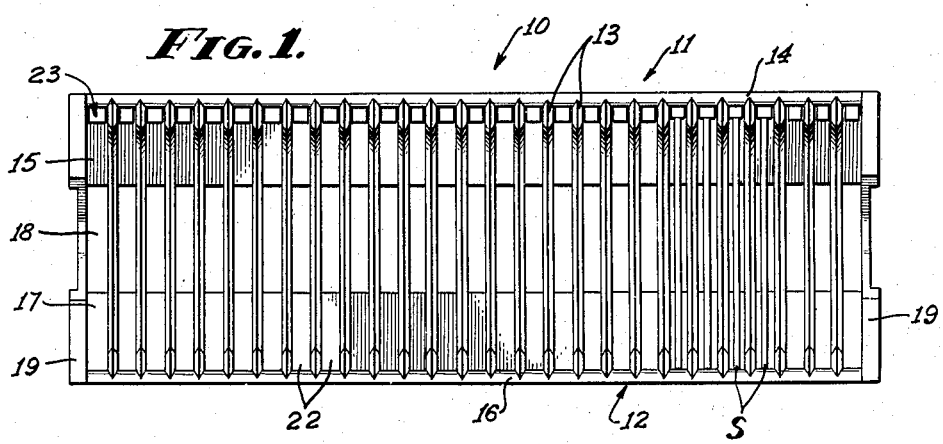
Figure 1 is a side elevational view of the slide tray when disposed in the position in which it is mounted in the slide changer.
Figure 2:
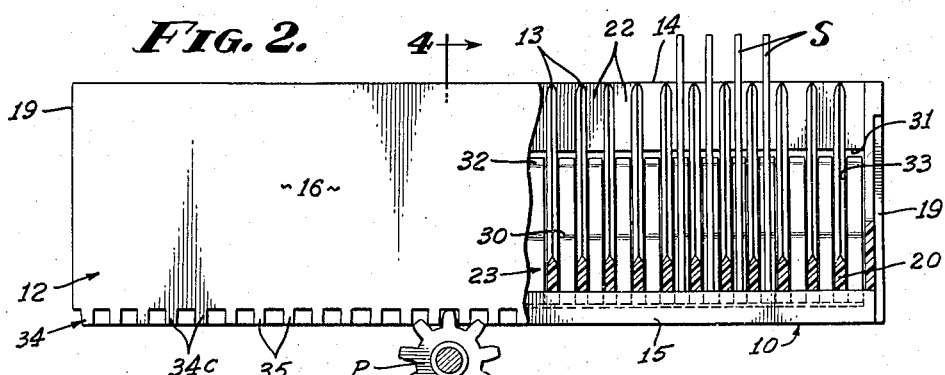
Fig. 2 is a bottom plan view, with parts shown in section, of the slide tray, and a pinion gear forming part of the changer apparatus for shifting the tray.
Figure 4:
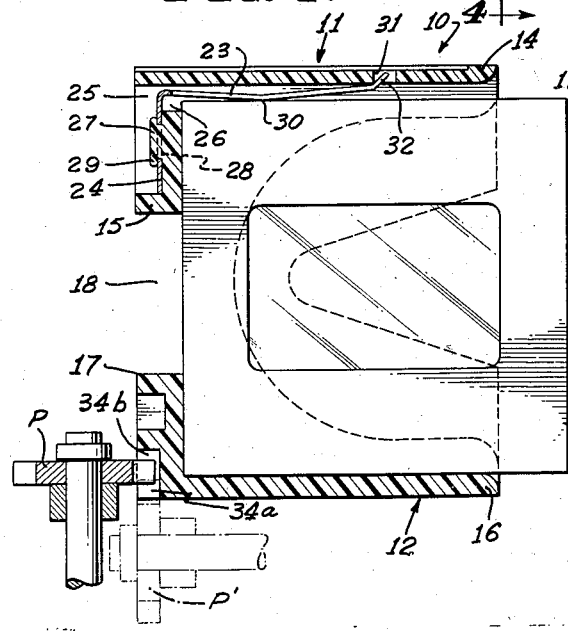
Fig. 4 is an enlarged cross-section taken along the line 4—4 on Fig. 2.
Figure 3:
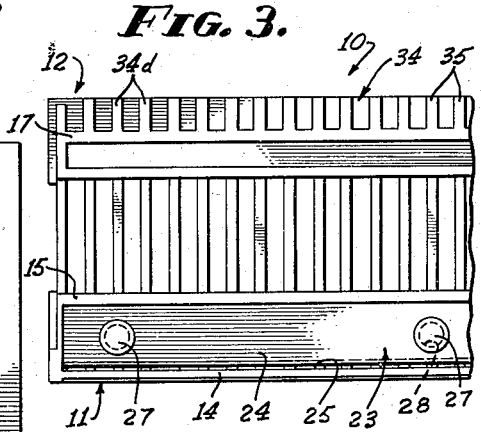
Fig. 3 is an elevation of a portion of the other side of the tray.

A slide tray 10 is disclosed in the drawings, which is adapted to contain a plurality of photographic slides S in parallel adjacency, and which can also be disposed in a slide changer (not shown) capable of feeding the entire tray progressively or selectively to align the transparency slides individually in position to be shifted into appropriate registry with the light beam openings of the projector (not shown), and for subsequent return to their original location in the slide tray. The slide changer and projector form no part of the present invention. For purpose of information, the slide tray 10 disclosed in the drawings is adapted for use in the slide changer and projector apparatus shown in Patent No. 2,590,492, to which attention is invited.

The slide tray 10 is shiftably mounted in the slide changing apparatus, in a position in which each slide can be moved sideways from the tray into the projector, and then returned sideways into the slide tray. As disclosed in the drawings, the slide tray includes vertically spaced upper and lower frame members 11, 12 that are separated into parallel compartments by dividers or partitions 13 extending therebetween. Preferably, the parallel partitions 13 and the upper and lower frame members 11, 12 are made integral with each other.

The upper frame member 11 includes an elongate horizontal wall 14 integral with an elongate flange 15 depending from one side thereof. The lower frame 12 includes a lower elongate wall 16 substantially parallel to the upper wall 14, which is integral with an upwardly extending flange 17 opposed to the upper flange 15 and spaced therefrom by a substantial amount to provide an elongate longitudinally extending opening 18 therebetween, through which the yoke (not shown) of the slide changer can move. The upper and lower frame members 11, 12 are arranged in opposed relation to each other, and are secured to one another by end walls 19 and also by the dividers or partitions 13, which are U-shaped and arranged parallel to each other substantially perpendicular to the upper and lower walls 14, 16 and the flanges 15, 17, to all of which they are secured. The base 20 of each partition extends across the flanges 15, 17 and the opening 18 therebetween, whereas the arms 21 of the partitions extend along the inner surfaces of the walls 14, 16. The upper and lower frame members 11, 12, end walls 19 and partitions 13 are preferably integral with one another, being formed of a suitable synthetic resin by a molding operation.

The side of the tray remote from the yoke opening 18 and flanges 15, 17 is open to permit the slides S to be disposed in the compartments 22 defined by the partitions 13. The distance between adjacent dividers or partitions 13 is greater than the thickness of a photographic slide S, whereas the distance between the inner surfaces of the upper and lower walls 14, 16 is slightly greater than the height of a slide S, in order that the slide can be readily inserted in the tray within its compartment 22 and removed therefrom. The distance between the flanges 15, 17 and the other ends of the frame members 11, 12, and the width of the partitions, is less than the normal width of a slide S, to facilitate loading and unloading of the tray.

For the purpose of preventing the photographic slides S from being inadvertently removed from the tray, a retainer device is employed that is adapted to frictionally grip each slide, releasably holding it within the tray. The specific retainer device illustrated in the drawings includes a plurality of spring arms 23 disposed within the compartments 22 adjacent one of the walls, such as the upper wall 14. Each spring arm 23 is made of relatively thin flexible metal, being integral with a body or base 24 disposed within an external longitudinal groove 25 in the upper flange 15, the springs 23 extending inwardly through slots or openings 26 in the flange 15 into the compartments 22. The body 24 of the spring device, which extends substantially completely along the entire length of the slide tray within the groove 25 is secured to the flange by plastic material 27 affixed to the flange 15 and extending through longitudinally spaced holes or openings 28 in the base 24, the external portion of the material being formed as a flange 29 engaging the outer surface of the body to hold it firmly against the bottom of the groove 25.

The leaf spring arms 23 extend inwardly of the upper frame 11, there being an inwardly bowed intermediate portion 30 in each compartment 22 adjacent the upper wall 14 adapted to engage the upper edge of a slide S in the compartment. The end of each spring arm 23 is bent outwardly into an opening 31 in the upper wall 14, to form an inclined finger 32 terminating outwardly of the inner surface of the wall 14, to avoid interference with the insertion and removal of a picture slide S into and out of its compartment. When a slide S is disposed in its compartment 22, its lower edge will engage the inner surface of the lower wall 16, against which it is forced with a relatively light pressure by the spring member 23. During the insertion of the slide S into the spring member, it tends to deflect the arm 23 in an outward direction, providing a spring force in the arm and its frictionally gripping or engagement with the upper edge of the slide. This force need only be sufficient to prevent the slide from inadvertently dropping out of its position completely within the tray.

The retainer device can be formed in an economical manner from a single piece of sheet metal shim stock. The shim stock is provided with parallel slots 33 to form the arm portion 23, the slots allowing the spring arms to be disposed within each compartment 22, with the dividers or partitions 13 located in the slots 33. The arms 23 and the base portion are bent substantially at right angles to each other, the intermediate portions 30 of the arms being bowed inwardly, so as to exert the proper spring force against the slides, and the fingers 32 bent outwardly of the arms.

The tray 10 is shifted along the holder of the slide changer by a rack and pinion device, the rack being formed on the tray itself, and the pinion P constituting part of the slide changer apparatus. One of the flanges, such as the lower flange 17 of the tray, is formed as a rack 34, the teeth 35 of which face outwardly from the side and also downwardly from the bottom of the lower frame member 12. The teeth 35 are also so shaped as to be engaged by a pinion P rotatable in a substantially horizontal position, or by a pinion P¹ that is rotatable in a substantially vertical plane. Thus, if the slide changer embodies a pinion P¹ located below the position of the tray, and rotatable in a generally vertical plane, then the pinion teeth can engage the downwardly facing portions 34a of the rack teeth, the pinion being capable of advancing the tray appropriately along the slide changer, to bring the slides progressively or selectively into proper registry with the yoke of the changer. As explained above, the yoke can move through the opening 18 between the flanges 15, 17 to engage each slide S individually and shift it into appropriate registered position in the projector and then return the slide back into its compartment in the tray, whereupon the pinion P¹ is rotated the proper amount to feed the tray 10 in the changer device so that another slide S is appropriately aligned with the changer shifting mechanism.

On the other hand, if the slide changer embodies a pinion P mounted for horizontal rotation, then such pinion can engage the laterally facing rack teeth portion 34b at the side portion of the lower flange 17, to feed the tray appropriately and selectively or progressively register each slide S in the changer device for movement into and out of the projector.

The rack teeth 34 are appropriately formed for engagement by a pinion P at its side, or by a pinion P¹ located below it. Each tooth has two end faces 34c, 34d substantially at right angles to each other and of substantially the same width to provide the proper tooth spaces for reception of the pinion teeth, both when the pinion is horizontally disposed and vertically disposed.

With the particular rack arrangement on the tray 10, it is possible for the latter to be used in a variety of specifically different slide changers. Regardless of the specific pinion mounting for shifting the slide tray in the changer, the spring retainer device will prevent inadvertent removal of the slides S from the tray. For that matter, during the handling of the tray, when it is not mounted in a changer, the spring device will prevent the slides from dropping out, even if the tray is inverted. Accordingly, damage to slides or their loss is prevented.

The inventor claims:

1. In a slide tray for photographic slide changers: a frame comprising a pair of spaced walls, a flange secured to an end of each wall, said flanges extending toward each other in spaced relation; a plurality of parallel partitions extending between and secured to said walls and flanges, said partitions being spaced from each other to provide compartments for the reception of transparency slides; one of said flanges having openings therethrough from the exterior of said one flange to said compartments; and a slide retainer having a base portion secured to the exterior of said one flange and having leaf spring elements extending from said base portion through said openings into said compartments along the wall secured to said one flange, said leaf spring elements being adapted to engage edges of slides in the compartments containing said elements.

2. In a slide tray for photographic slide changers: a frame comprising a pair of spaced walls, a flange secured to an end of each wall, said flanges extending toward each other in spaced relation; a plurality of parallel partitions extending between and secured to said walls and flanges, said partitions being spaced from each other to provide compartments for the reception of transparency slides; and a slide retainer secured to one of said flanges and having a leaf spring element extending into each of said compartments along the wall secured to said one flange, said leaf spring element being adapted to engage an edge of the slide in the compartment containing said element, said leaf spring element including an outwardly directed finger at its free end extending into an opening in said wall secured to said one flange.

3. In a slide tray for photographic slide changers: a frame comprising a pair of spaced walls, a flange secured to an end of each wall, said flanges extending toward each other in spaced relation; a plurality of parallel partitions extending between and secured to said walls and flanges, said partitions being spaced from each other to provide compartments for the reception of transparency slides; and a sheet metal slide retainer including a base portion extending along and secured to one of said flanges, said retainer having leaf spring arms integral with said base portion and extending therefrom into said compartments along the wall secured to said one flange; said arms being adapted to frictionally engage the edges of slides disposed in said compartment.

4. In a slide tray for photographic slide changers: a frame comprising a pair of spaced walls, a flange secured to an end of each wall, said flanges extending toward each other in spaced relation; a plurality of parallel partitions extending between and secured to said walls and flanges, said partitions being spaced from each other to provide compartments for the reception of transparency slides; and a sheet metal slide retainer including a base portion extending along and secured to one of said flanges, said retainer having leaf spring arms integral with said base portion and extending therefrom into said compartments along the wall secured to said one flange; each of said leaf spring arms having an inwardly bowed portion adapted to frictionally engage an edge of a slide in the compartment containing said arm; each arm terminating in an outwardly directed finger extending into an opening in the wall secured to said one flange.

References Cited in the file of this patent

UNITED STATES PATENTS

| | | |
|---|---|---|
| 67,981 | Houston | Aug. 20, 1867 |
| 332,661 | Knoebel | Dec. 15, 1885 |
| 1,026,268 | Kees | May 14, 1912 |
| 2,063,573 | Yeider | Dec. 8, 1936 |
| 2,590,492 | Bennett et al. | Mar. 25, 1952 |
| 2,740,326 | Reinebach | Apr. 6, 1956 |
| 2,774,472 | Badalich | Dec. 18, 1956 |

FOREIGN PATENTS

| | | |
|---|---|---|
| 565,565 | Germany | Dec. 3, 1932 |